US010263303B2

(12) United States Patent
Eom et al.

(10) Patent No.: US 10,263,303 B2
(45) Date of Patent: Apr. 16, 2019

(54) BATTERY MODULE AND BATTERY PACK INCLUDING SAME

(71) Applicant: LG CHEM, LTD., Seoul (KR)

(72) Inventors: Young-Sop Eom, Daejeon (KR);
Ki-Youn Kim, Daejeon (KR);
Jun-Yeob Seong, Daejeon (KR);
Sung-Chun Yu, Daejeon (KR); Dal-Mo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 267 days.

(21) Appl. No.: 15/304,009

(22) PCT Filed: Mar. 31, 2015

(86) PCT No.: PCT/KR2015/003199
§ 371 (c)(1),
(2) Date: Oct. 13, 2016

(87) PCT Pub. No.: WO2015/160115
PCT Pub. Date: Oct. 22, 2015

(65) Prior Publication Data
US 2017/0033419 A1 Feb. 2, 2017

(30) Foreign Application Priority Data

Apr. 14, 2014 (KR) .................. 10-2014-0044135

(51) Int. Cl.
*H01M 10/613* (2014.01)
*H01M 10/625* (2014.01)
(Continued)

(52) U.S. Cl.
CPC ..... *H01M 10/6557* (2015.04); *H01M 2/1077* (2013.01); *H01M 2/12* (2013.01);
(Continued)

(58) Field of Classification Search
CPC .. H01M 2/12; H01M 2/1077; H01M 10/0413; H01M 10/052; H01M 10/613;
(Continued)

(56) References Cited

U.S. PATENT DOCUMENTS

2009/0258289 A1 10/2009 Weber et al.
2012/0040222 A1* 2/2012 Quick ................. H01M 10/647
429/120
(Continued)

FOREIGN PATENT DOCUMENTS

JP 2012-227120 A 11/2012
KR 10-2009-0002428 A 1/2009
(Continued)

OTHER PUBLICATIONS

International Search Report for PCT/KR2015/003199 dated Jul. 30, 2015.

*Primary Examiner* — Brittany L Raymond
(74) *Attorney, Agent, or Firm* — Birch, Stewart, Kolasch & Birch, LLP

(57) ABSTRACT

Disclosed is a battery module capable of preventing a gas generated from a secondary battery from flowing into a cooling flow path or a duct connected thereto. The battery module includes a plurality of pouch-type secondary batteries; a first frame having an upper cooling plate and a lower cooling plate disposed to be spaced apart from each other by a predetermined distance in a vertical direction to form a cooling flow path in a space therebetween and configured to accommodate the pouch-type secondary battery in at least one of an upper portion of the upper cooling plate and a lower portion of the lower cooling plate; and a second frame having an upper cooling plate and a lower cooling plate to accommodate the pouch-type secondary battery in a way identical to the first frame, the second frame being stacked on the first frame to form a venting flow path in a space between the first frame and the second frame.

15 Claims, 11 Drawing Sheets

(51) Int. Cl.
*H01M 10/647* (2014.01)
*H01M 10/6557* (2014.01)
*H01M 10/6566* (2014.01)
*H01M 2/10* (2006.01)
*H01M 2/12* (2006.01)
*H01M 10/6563* (2014.01)
*H01M 10/04* (2006.01)
*H01M 10/052* (2010.01)

(52) U.S. Cl.
CPC ....... *H01M 10/613* (2015.04); *H01M 10/625* (2015.04); *H01M 10/647* (2015.04); *H01M 10/6563* (2015.04); *H01M 10/6566* (2015.04); *H01M 10/0413* (2013.01); *H01M 10/052* (2013.01); *H01M 2220/20* (2013.01); *Y02E 60/122* (2013.01)

(58) Field of Classification Search
CPC ............. H01M 10/625; H01M 10/647; H01M 10/6557; H01M 10/6563; H01M 10/6566; H01M 2220/20; Y02E 60/122
See application file for complete search history.

(56) References Cited

U.S. PATENT DOCUMENTS

| | | |
|---|---|---|
| 2012/0263984 A1 | 10/2012 | Krammer |
| 2012/0282506 A1 | 11/2012 | Hohenthanner et al. |
| 2014/0050953 A1* | 2/2014 | Yoon .................. H01M 2/1077 429/82 |
| 2014/0242429 A1 | 8/2014 | Lee et al. |

FOREIGN PATENT DOCUMENTS

| | | |
|---|---|---|
| KR | 10-2013-0086677 A | 8/2013 |
| KR | 10-2013-0120261 A | 11/2013 |
| WO | WO 2013/037742 A1 | 3/2013 |

\* cited by examiner

BATTERY MODULE AND BATTERY PACK INCLUDING SAME

TECHNICAL FIELD

The present application claims priority to Korean Patent Application No. 10-2014-0044135 filed on Apr. 14, 2014 in the Republic of Korea, the disclosures of which are incorporated herein by reference.

The present disclosure relates to a battery, and more particularly, to a battery module having an improved structure to prevent a gas generated from a secondary battery from flowing into a cooling flow path, and a battery pack including the same.

BACKGROUND ART

Currently, nickel-cadmium batteries, nickel-metal hydride batteries, nickel-zinc batteries, lithium secondary batteries, and the like are used as commercial secondary batteries. Among them, lithium secondary batteries have little to no memory effect in comparison with nickel-based secondary batteries, and thus lithium secondary batteries are gaining a lot of attention for their advantages of free charging or discharging, low self-discharging, and high energy density.

A lithium secondary battery generally uses lithium oxide and carbonaceous material as a positive electrode active material and negative electrode active material, respectively. The lithium secondary battery includes an electrode assembly in which a positive electrode plate and a negative electrode plate respectively coated with the positive electrode active material and the negative electrode active material are disposed with a separator being interposed between them, and an exterior, namely a battery case, which seals and accommodates the electrode assembly together with an electrolyte.

Generally, a lithium secondary battery may be classified into a can-type secondary battery where the electrode assembly is included in a metal can and a pouch-type battery where the electrode assembly is included in a pouch of an aluminum laminate sheet, depending on the shape of the exterior.

Recently, secondary batteries are widely used in middle- or large-sized devices like vehicles and power storage devices as well as small-sized devices like portable electronic appliance. When used in such middle- or large-sized devices, a plurality of secondary batteries are electrically connected in large numbers to increase the capacity and output. Especially, in such middle- or large-sized devices, pouch-type secondary batteries are usually employed because they can easily be stacked.

However, the pouch-type secondary battery does not give great mechanical rigidity since it is packaged with a battery pack generally made of a laminate sheet of aluminum and polymer resin. Therefore, when a battery module including a plurality of pouch-type secondary batteries is configured, frames are frequently used to protect the secondary batteries against external impacts, prevent the secondary batteries from moving and facilitate easier stacking.

The frame may also be called with various terms such as a cartridge. The frame generally has a rectangular plate shape with a hollow center, and at this time, four side portions of the frame are configured to surround an outer circumference of the pouch-type secondary battery. In addition, a plurality of frames is stacked to configure a battery module, and a secondary battery may be located in an empty space created by stacking frames.

Meanwhile, when a plurality of secondary batteries is assembled using a plurality of frames as described above, a cooling fin having a plate shape may be interposed between secondary batteries. A secondary battery may be used under a high-temperature environment, for example in summer, and the secondary battery may generate in itself. At this time, if a plurality of secondary batteries is stacked, the temperature of the secondary batteries may be increased further, and if the temperature rises over a suitable level, the performance of the secondary batteries may be deteriorated, and in severe cases, the secondary batteries may be fired or exploded. Therefore, when a battery module is configured, a cooling fin is frequently interposed between secondary batteries so that the cooling fin prevents the temperature of the secondary batteries from rising.

If a battery module includes a plate-like cooling fin, namely a cooling plate, interposed between secondary batteries, the secondary batteries may be cooled in various ways. Representatively, an air-cooling method for allowing an external air to flow around the cooling plate and thus lowering a temperature of secondary batteries by exchanging heat between the cooling plate and the air is widely used. If a battery module uses the air-cooling method to cool secondary batteries, a cooling flow path should be ensured around the cooling plate, and the cooling flow path should be connected to a duct so that air may flow into or out of the battery module.

However, if the battery module is configured as above, a gas generated from a secondary battery may flow out through the cooling flow path and the duct. In other words, a pouch-type secondary battery may generate a gas in use, and the gas may contain ingredients harmful to a human body. However, if the harmful gas generated from a secondary battery penetrates into the cooling flow path, the penetrating gas may be discharged out through the duct, and a battery user may inhale the discharged harmful gas. In particular, in case of a hybrid vehicle or an electric vehicle, a middle- or large-sized battery pack including numerous secondary batteries is mounted, and thus gas may be more likely to be discharged from the secondary batteries. In addition, if a harmful gas is discharged from such a battery pack for a vehicle and flows into the duct, a vehicle driver may inhale the harmful gas flowing into the duct, which may harm the driver and also deteriorate driving ability of the driver to cause an accident.

DISCLOSURE

Technical Problem

The present disclosure is designed to solve the problems of the related art, and therefore the present disclosure is directed to providing a battery module, which may prevent a gas generated from a secondary battery from flowing into a cooling flow path and a duct connected thereto, and a battery pack including the same.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising: a plurality of pouch-type secondary batteries; a first frame having an upper cooling plate and a lower cooling plate disposed to be spaced apart from each other by a predetermined distance in a vertical direction to form a cooling flow path in a space therebetween and configured to accommodate the pouch-type secondary battery in at least one of an upper portion of the upper cooling plate and a lower portion of the lower cooling plate; and a second frame having an upper cooling plate and a lower cooling plate to accommodate the pouch-type secondary battery in a way identical to the first frame, the second frame being stacked on the first frame to form a venting flow path in a space between the first frame and the second frame.

Preferably, the venting flow path may be physically separated from the cooling flow path.

Also preferably, the venting flow path may be formed at a location where a sealing portion of the pouch-type secondary battery is located, in a space between the upper cooling plate of the first frame and the lower cooling plate of the second frame.

Also preferably, the cooling flow path may have openings at right and left sides thereof to allow a cooling gas to flow in a right and left direction, and the venting flow path may have an opening in at least one of a front side and a rear side to allow a venting gas to flow in a front and rear direction.

Also preferably, the battery module may further comprises an inflow duct configured to cover the right opening of the cooling flow path and having an inlet formed at an outer side thereof and an open portion formed at an inner side thereof so that a cooling gas introduced through the inlet flows into the cooling flow path through the open portion; and an outflow duct configured to cover the left opening of the cooling flow path and having an outlet formed at an outer side thereof and an open portion formed at an inner side thereof so that a cooling gas discharged from the cooling flow path flows into the open portion and flows out through the outlet.

Also preferably, at least one of the inflow duct and the outflow duct may have a duct sealing member at a portion in contact with the first frame and the second frame to prevent a gas leakage.

Also preferably, an electrode tab of the secondary battery may be located at the opening of the venting flow path, the battery module may further comprise a sensing assembly coming into contact with the electrode tab of the secondary battery to measure a voltage of the secondary battery, and the sensing assembly may have a discharge hole formed at an upper portion thereof to discharge a venting gas introduced at the opening of the venting flow path.

Also preferably, uneven portions may be formed at an upper portion of the first frame and a lower portion of the second frame to have shapes corresponding to each other, and when the first frame and the second frame are stacked, the uneven portions maybe coupled to each other to prevent an interior venting gas from flowing outwards.

Also preferably, the uneven portions may be formed at a left unit frame and a right unit frame of the first frame and the second frame.

Also preferably, the uneven portions may include at least two uneven portions formed at an upper portion of the left unit frame of the first frame and an upper portion of the right unit frame of the first frame, respectively, and at least two uneven portions formed at an upper portion of the left unit frame of the second frame and an upper portion of the right unit frame of the second frame, respectively.

Also preferably, the two or more uneven portions may be arranged in a right and left direction with respect to the first frame and the second frame, respectively.

Also preferably, the uneven portions may be configured to have a convex portion and a concave portion at all of the upper portions and the lower portions of the first frame and the second frame.

Also preferably, the first frame may have a frame sealing member provided at an upper portion thereof to prevent a gas from leaking between the first frame and the second frame.

Also preferably, the pouch-type secondary battery may have a left sealing portion and a right sealing portion which are folded inwards.

In another aspect of the present disclosure, there is also provided a battery pack, which comprises the battery module according to the present disclosure.

In another aspect of the present disclosure, there is also provided a vehicle, which comprises the battery module according to the present disclosure.

Advantageous Effects

According to an embodiment of the present disclosure, a cooling flow path in which a cooling gas for exchanging heat with a secondary battery may be securely physically separated from a space where the secondary battery is accommodated.

Therefore, according to an embodiment of the present disclosure, even though a gas is generated from the secondary battery, it can be effectively prevented that the generated gas flows into a cooling flow path.

In particular, according to an embodiment of the present disclosure, when frames for secondary batteries are stacked, convex portions formed at an upper portion and/or a lower portion thereof are inserted into and coupled to insert grooves formed at the lower portion and/or the upper portion thereof, and thus a path through which the gas may leak from the inner space accommodating the secondary battery to the cooling flow path may be complicated. In addition, when a gas is generated from the secondary battery, inner pressure of the frames may be increased so that the convex portions and the insert grooves are deformed to become closer, and thus the path from the inside of the frames to an outside thereof may be blocked more securely.

Therefore, according to the present disclosure, even though a harmful gas is generated from a secondary battery, it is possible to prevent the generated gas from being transferred to a user of the battery pack through the cooling flow path and the duct.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
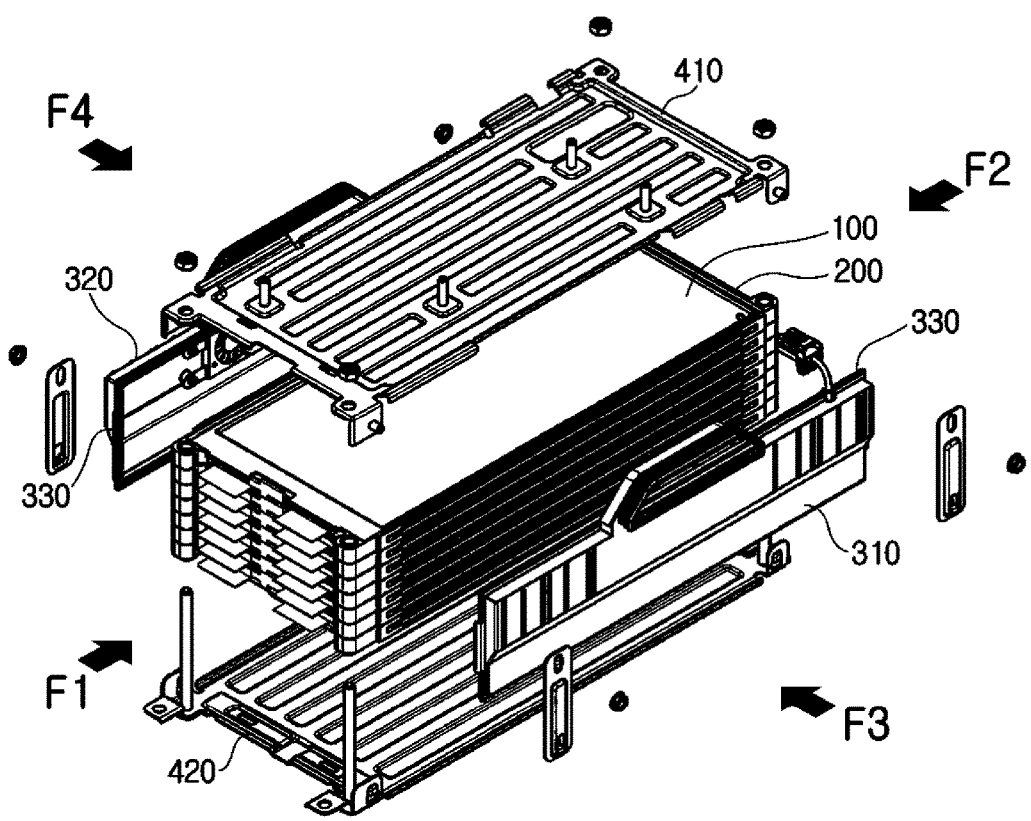
FIG. 1 is an exploded perspective view schematically showing a battery module according to an embodiment of the present disclosure.
Figure 2:
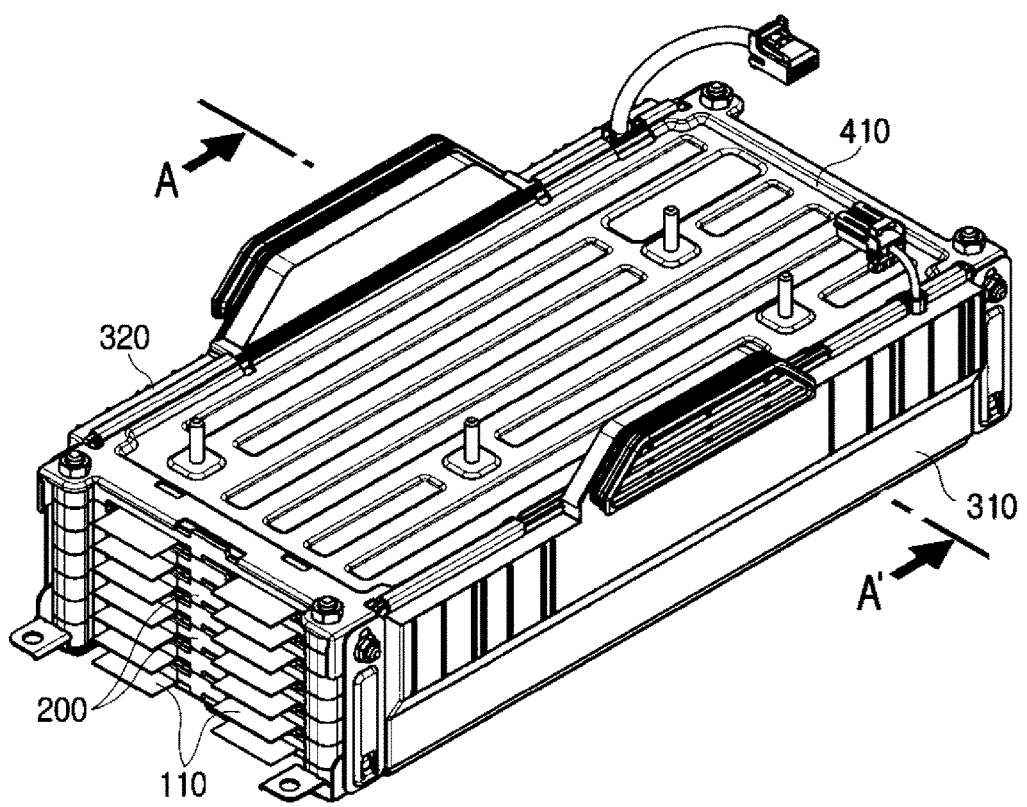
FIG. 2 is an assembled perspective view showing the configuration of FIG. 1.

FIG. 1 is an exploded perspective view schematically showing a battery module according to an embodiment of the present disclosure, and FIG. 2 is an assembled perspective view showing the configuration of FIG. 1.

Referring to FIGS. 1 and 2, a battery module according to the present disclosure includes a secondary battery 100 and a frame 200.

A plurality of secondary batteries 100 may be included in the battery module, and the secondary batteries 100 may be pouch-type secondary batteries. In this case, the plurality of pouch-type secondary batteries may be stacked in one direction, for example in a vertical direction as shown in FIG. 1.

The frame 200 is used for stacking the pouch-type secondary battery 100 and may also be called with various terms such as a cartridge. In particular, the frame 200 may hold the secondary battery 100 not to move, and also a plurality of frames 200 may be stacked to guide the secondary batteries 100 to be assembled.

As described above, in the present disclosure, two or more frames 200 may be provided since they should be stacked in order to stack a plurality of pouch-type secondary batteries 100.

Figure 3:
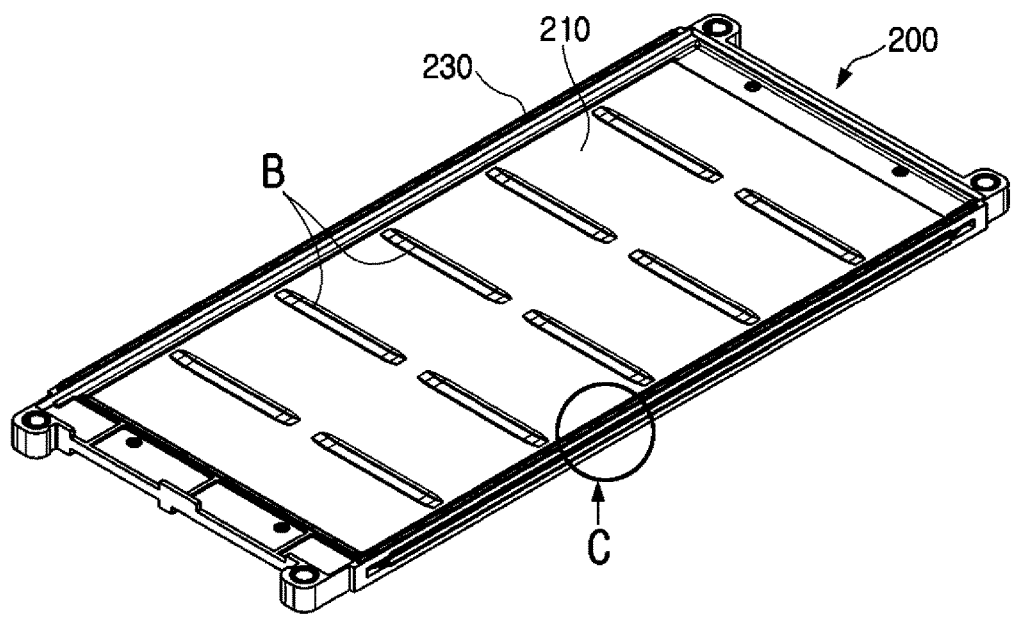
FIG. 3 is a perspective view showing a single frame, separated from the battery module of FIGS. 1 and 2.
Figure 4:
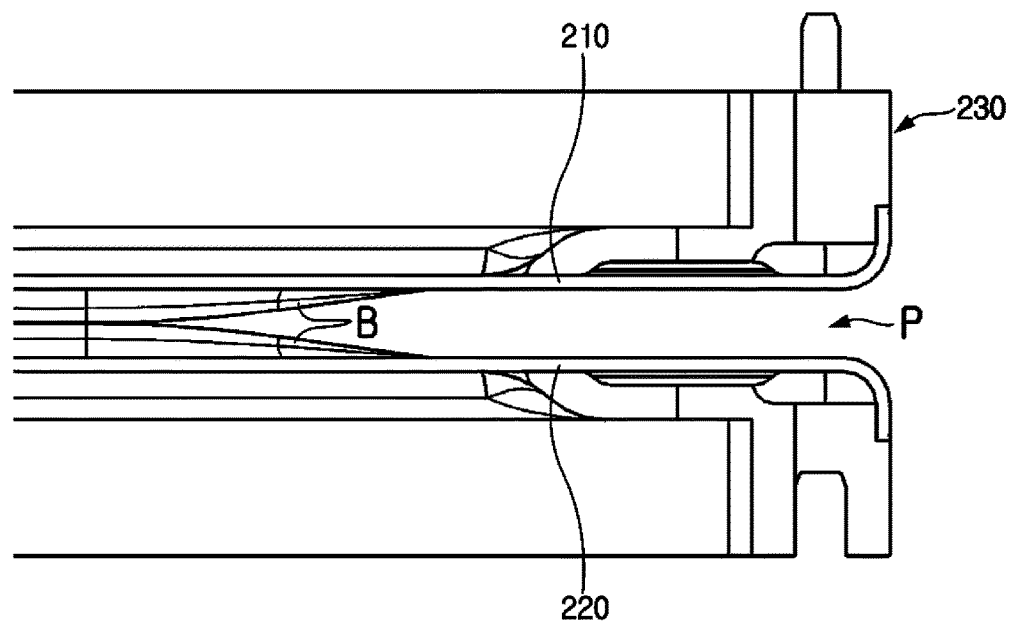
FIG. 4 is a vertical-sectioned view showing a portion C of FIG. 3.

FIG. 3 is a perspective view showing a single frame 200, separated from the battery module of FIGS. 1 and 2, and FIG. 4 is a vertical-sectioned view showing a portion C of FIG. 3.

As shown in FIGS. 3 and 4, each frame 200 included in the battery module of the present disclosure may include an upper cooling plate 210, a lower cooling plate 220 and a main frame 230.

The upper cooling plate 210 has a wide plate shape and may be disposed to lay down so that its wide surfaces are oriented in an upper and lower direction. In particular, the upper cooling plate 210 may have a rectangular plate shape.

The lower cooling plate 220 also has a plate shape, similar to the upper cooling plate 210, and may have a shape corresponding to the upper cooling plate 210, for example a shape identical to the upper cooling plate 210. In particular, in each frame, the lower cooling plate 220 may be disposed at a lower portion of the upper cooling plate 210 so that its wide surface faces the wide surface of the upper cooling plate 210. At this time, the lower cooling plate 220 may be disposed to be spaced apart from the upper cooling plate 210 by a predetermined distance. Further, the lower cooling plate 220 may be disposed to be in parallel to the upper cooling plate 210 in a horizontal direction.

As described above, the lower cooling plate 220 is disposed to be spaced apart from the upper cooling plate 210 to some degree, and thus an empty space may be formed between the lower cooling plate 220 and the upper cooling plate 210 as indicated by P in FIG. 4. In addition, a fluid for cooling, for example a cooling gas such as an external air, may flow in the empty space formed as above, and thus the empty space between the lower cooling plate 220 and the upper cooling plate 210 may serve as a flow path. In other words, the upper cooling plate 210 and the lower cooling plate 220 may be disposed to be spaced apart in a vertical direction to form a cooling flow path in the space between them.

However, the lower cooling plate 220 may be partially in contact with the upper cooling plate 210, without being entirely spaced apart from the upper cooling plate 210. For example, as indicated by B in FIGS. 3 and 4, one or more beading portions may be formed at the upper cooling plate 210 and the lower cooling plate 220 so that the beading portions come into contact with each other. In other words, a beading portion may be formed at the upper cooling plate 210 to protrude downwards, and a beading portion may be formed at the lower cooling plate 220 to protrude upwards, so that the beading portion of the upper cooling plate 210 and the beading portion of the lower cooling plate 220 come into contact with each other. In this configuration of the present disclosure, due to the contact of the beading portions, the distance between the upper cooling plate 210 and the lower cooling plate 220 is not decreased, and thus the cooling flow path may be stably maintained in a region other than the beading portions.

The upper cooling plate 210 and the lower cooling plate 220 may be made of material with thermal conductivity in order to exchange heat with secondary batteries 100 located at upper and lower portions thereof, respectively. In particular, both of the cooling plates may be made of aluminum which has excellent thermal conductivity and light weight and ensures easy fabrication. However, the present disclosure is not limited to the above material of the cooling plate, and the cooling plate may be made of various materials such as metals other than aluminum.

The main frame 230 may be located at outer circumferences of the upper cooling plate 210 and the lower cooling plate 220, namely edges thereof. Therefore, the main frame 230 may be regarded as having four unit frames, both ends of which are connected to each other. In other words, as shown in FIG. 3, the main frame 230 may have four sides with a rectangular ring shape having a hollow center, when being observed from the above. In addition, in the main frame 230, each unit frame may be regarded as each side of a rectangle.

Here, the outer circumference of the pouch-type secondary battery 100 having four sides may be entirely placed on the main frame 230, or some of four sides, for example two sides, namely front and rear sides as indicated by F1 and F2 in FIG. 1, may be placed on the main frame 230.

In this configuration, the secondary battery stacking frame 200 having the upper plate, the lower plate and the main frame 230 as described above may be prepared by insert-injection-molding the main frame 230 in a state where the upper cooling plate 210 and the lower cooling plate 220 are overlapped to be spaced apart from each other by a predetermined distance. However, the present disclosure is not limited to the frame preparation method.

The battery module according to the present disclosure includes two or more frames 200, and these frames 200 may be stacked in a vertical direction. In addition, an inner space of the stacked frames 200 may accommodate a pouch-type secondary battery. In other words, in the battery module according to the present disclosure, the frames 200 respectively having a cooling plate and a lower plate in an identical way may be stacked vertically while accommodating a pouch-type secondary battery therein. Hereinafter, a frame 200 located at a lower position is called a first frame, and a frame 200 located at an upper position and stacked thereon is called a second frame, for convenience.

Figure 5:
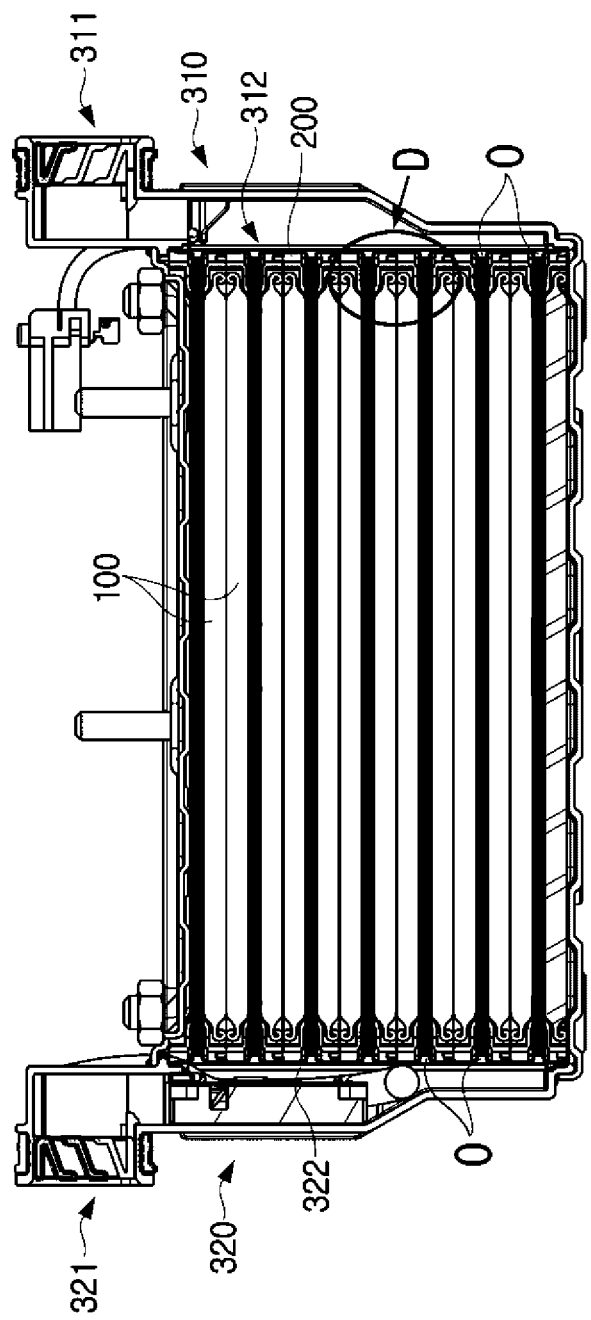
FIG. 5 is a cross-sectioned view, taken along a line A-A' of FIG. 2.
Figure 6:
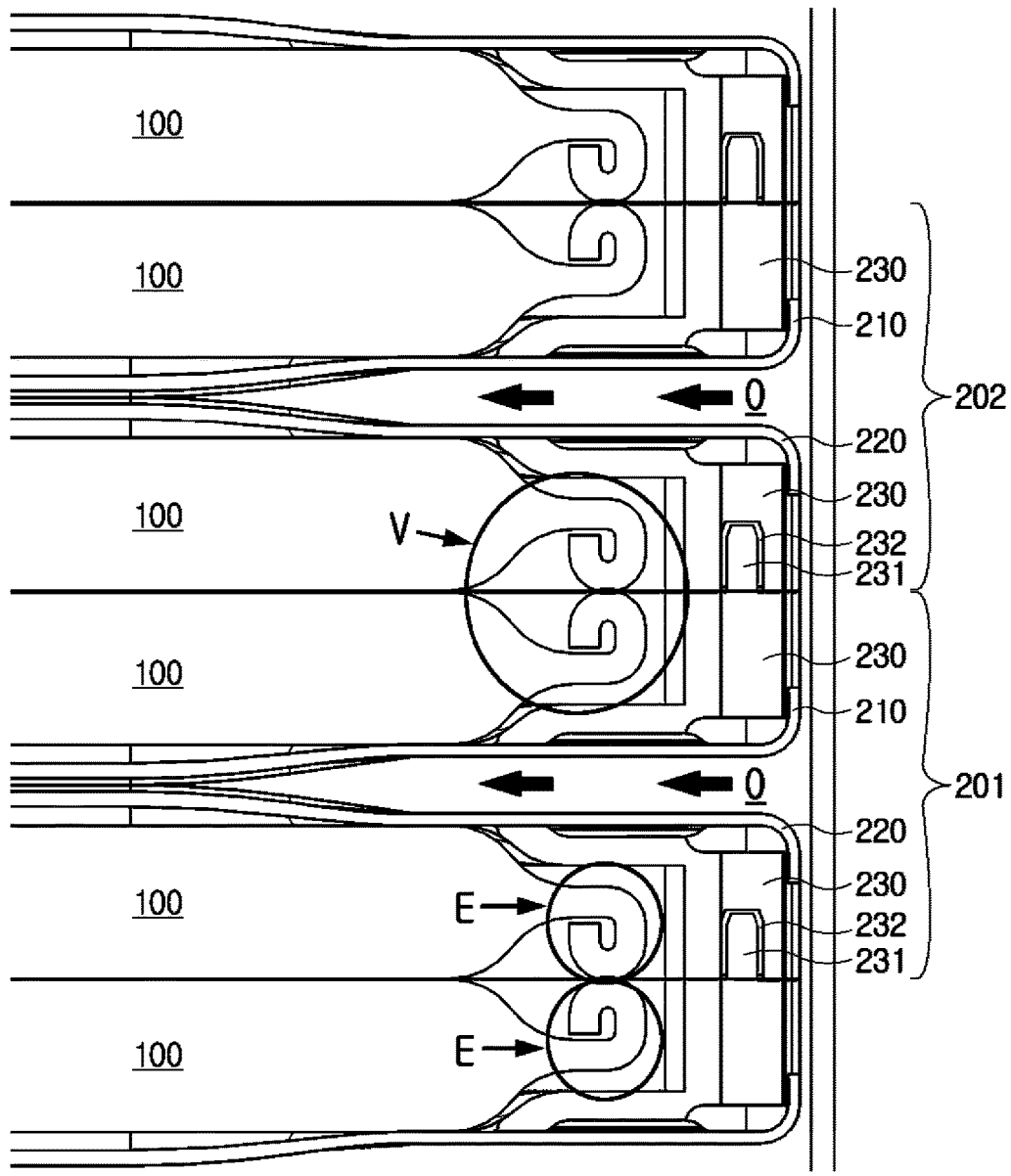
FIG. 6 is an enlarged view showing a portion D of FIG. 5.

FIG. 5 is a cross-sectioned view, taken along a line A-A' of FIG. 2, and FIG. 6 is an enlarged view showing a portion D of FIG. 5.

As shown in FIGS. 5 and 6, the battery module according to the present disclosure includes a plurality of frames 200 stacked to each other, and a secondary battery may be accommodated in an inner space formed by the stacked frames 200.

In particular, referring to FIG. 6, it is depicted that two frames are stacked, where a frame located at a lower position may be called a first frame 201 and a frame located at an upper position may be called a second frame 202.

At this time, the first frame 201 and the second frame 202 may respectively include an upper cooling plate 210 and a lower cooling plate 220 and have a cooling flow path formed therein.

In addition, the first frame 201 and the second frame 202 may accommodate a pouch-type secondary battery in at least one location of an upper portion of the upper cooling plate 210 and a lower portion of the lower cooling plate 220.

For example, as shown in FIG. 6, the first frame 201 may accommodate a single pouch-type secondary battery at the upper portion of the upper cooling plate 210 and accommodate another single pouch-type secondary battery at the lower portion of the lower cooling plate 220. In addition, the second frame 202 stacked on the first frame 201 may also accommodate a single secondary battery at the upper portion of the upper cooling plate 210 and accommodate another single secondary battery at the lower portion of the lower cooling plate 220. In this case, two pouch-type secondary batteries may be accommodated in the space between the upper cooling plate 210 of the first frame 201 and the lower cooling plate 220 of the second frame 202.

In particular, in the present disclosure, the first frame 201 and the second frame 202 vertically stacked may form a venting flow path in a space between them, formed by stacking. Here, the venting flow path may mean a passage through which a gas generated from a secondary battery may move for venting in the battery module.

Preferably, the venting flow path may be physically separated from the cooling flow path. Here, the physical separation means that the venting flow path and the cooling flow path are not connected to each other in the battery module. Therefore, in this configuration, the fluid flowing through the venting flow path may not flow into the cooling flow path in the battery module. For this reason, in this configuration of the present disclosure, since the venting flow path and the cooling flow path are isolated from each other, the gas generated from the secondary battery may flow just through the venting flow path but may not flow through the cooling flow path.

Also preferably, the venting flow path may be formed at a position where a sealing portion of the pouch-type secondary battery is located, in the space between the upper cooling plate 210 of the first frame 201 and the lower cooling plate 220 of the second frame 202. In other words, as shown in FIG. 6, the pouch-type secondary battery may be accommodated in the space formed by the upper cooling plate 210 of the first frame 201 and the lower cooling plate 220 of the second frame 202, and the venting flow path may be formed at a position where the sealing portion of the pouch-type secondary battery is located, as indicated by a dotted line V. Here, as indicated by S in FIG. 6, the sealing portion may mean an edge portion of the pouch-type secondary battery at which an upper pouch and a lower pouch for accommodating an electrode assembly are sealed by means of thermal bonding.

Also preferably, based on the shape of the battery module observed from the above, the cooling flow path and the venting flow path may be configured to have openings at different locations. In other words, the cooling flow path and the venting flow path may be configured to allow fluid to flow horizontally but in different directions. In particular, the flowing direction of the cooling gas through the cooling flow path and the flowing direction of the venting gas through the venting flow path may be perpendicular to each other. Here, the venting gas means a gas which is generated from a secondary battery or the like and should be discharged out of the battery module.

For example, as indicated by O in FIGS. 5 and 6, the cooling flow path may have openings formed at right and left sides thereof. In this case, a cooling gas out of the battery module may flow into the cooling flow path through any one opening, and a cooling gas flowing through cooling flow path may be discharged out of the battery module from the cooling flow path through the other opening. Therefore, in this case, the cooling gas may flow in a right and left direction of the battery module, as indicated by arrows in FIG. 6.

At this time, the venting flow path may have an opening formed at a location different from the opening O of the cooling flow path. In particular, the opening of the venting flow path may be formed in at least one of a front side and a rear side. In this case, the venting gas may flow in a front and rear direction of the battery module.

For example, in the configuration of FIG. 1, the cooling flow path may have openings formed at a right side of the battery module as indicated by F3 and at a left side of the battery module as indicated by F4, and the venting flow path may have openings formed at a front side of the battery module as indicated by F1 and/or at a rear side of the battery module as indicated by the F2. In this configuration of the present disclosure, since the discharging direction of the cooling gas is different from the discharging direction of the venting gas, it is possible to more securely prevent the venting gas from flowing into the cooling flow path.

Preferably, the battery module according to the present disclosure may further include an inflow duct 310 and an outflow duct 320.

The inflow duct 310 may be located at one side of the battery module to cover the corresponding side surface of the battery module. In particular, the inflow duct 310 may cover one side of the openings O of the cooling flow path. For example, as shown in the figures, the inflow duct 310 may be configured to entirely cover the right openings of the cooling flow path.

In addition, the inflow duct 310 may have an inlet 311 formed at an outer side thereof and an open portion 312 formed at an inner side thereof. For example, based on FIG. 5, the inflow duct 310 may have the inlet 311 at a right top portion and have the open portion 312 at a left portion. Therefore, a cooling gas such as an air introduced through the right top portion through the inlet 311 may flow into the inner space of the inflow duct 310. In addition, the open portion 312 may be formed at a left side of the inflow duct 310, namely at an inner side, which is opposite to the outer side surface of the frame, so that the cooling gas flowing into the inner space thereof may flow into the cooling flow path through the open portion 312.

The outflow duct 320 may be located at the other side of the battery module to cover the corresponding side surface of the battery module. In particular, the outflow duct 320 may be configured to cover the other one of the openings O of the cooling flow path, namely the opening opposite to a side where the inflow duct 310 is provided. For example, as shown in the figures, the outflow duct 320 may be configured to entirely cover the left opening of the cooling flow path.

In addition, the outflow duct 320 may have an outlet 321 formed at an outer side thereof and an open portion 322 formed at an inner side thereof. For example, based on FIG. 5, the outflow duct 320 may have the outlet 321 at a left top portion and have the open portion 322 at a right portion. At this time, the open portion 322 of the outflow duct 320 is formed at a right side thereof, namely at an inner side, which faces an outer side surface of the frame, so that the cooling gas discharged from the cooling flow path may flow into the open portion 322. In addition, the cooling gas flowing into the inner space of the outflow duct 320 through the open portion 322 as described above may flow along the inner space of the outflow duct 320 and discharge out through the outlet 321.

More preferably, the inflow duct 310 may have a duct sealing member 330. Here, the duct sealing member 330 is a component provided at a contact portion with the first frame 201 and the second frame 202, and as shown in the figures, the duct sealing member 330 may be provided along an edge of the open portion 312 of the inflow duct 310.

The duct sealing member 330 allows better adhesion between the inflow duct 310 and the first frame, or between the inflow duct 310 and the second frame, at the openings O of the cooling flow path, thereby preventing a gap from being created between them and thus preventing a cooling gas therein from leaking out or an external air flowing into the cooling flow path.

In addition, the outflow duct 320 may have a duct sealing member 330. The duct sealing member 330 of the outflow duct 320 may have function and configuration similar to the duct sealing member 330 of the inflow duct 310 and thus is not described in detail here.

The duct sealing member 330 may be made of various materials which may ensure sealing. For example, the duct sealing member 330 may be made of rubber, silicon, Stryofoam, urethane or the like.

Meanwhile, the venting flow path may have an opening at a front side thereof, and as shown in FIGS. 1 and 2, an electrode tab 110 of each secondary battery may protrude at the front side. In other words, the electrode tab 110 of the secondary battery may be located at the opening of the venting flow path.

In addition, the battery module according to the present disclosure may further include a sensing assembly. Here, the sensing assembly is a component capable of measuring a voltage of a secondary battery.

Figure 7:
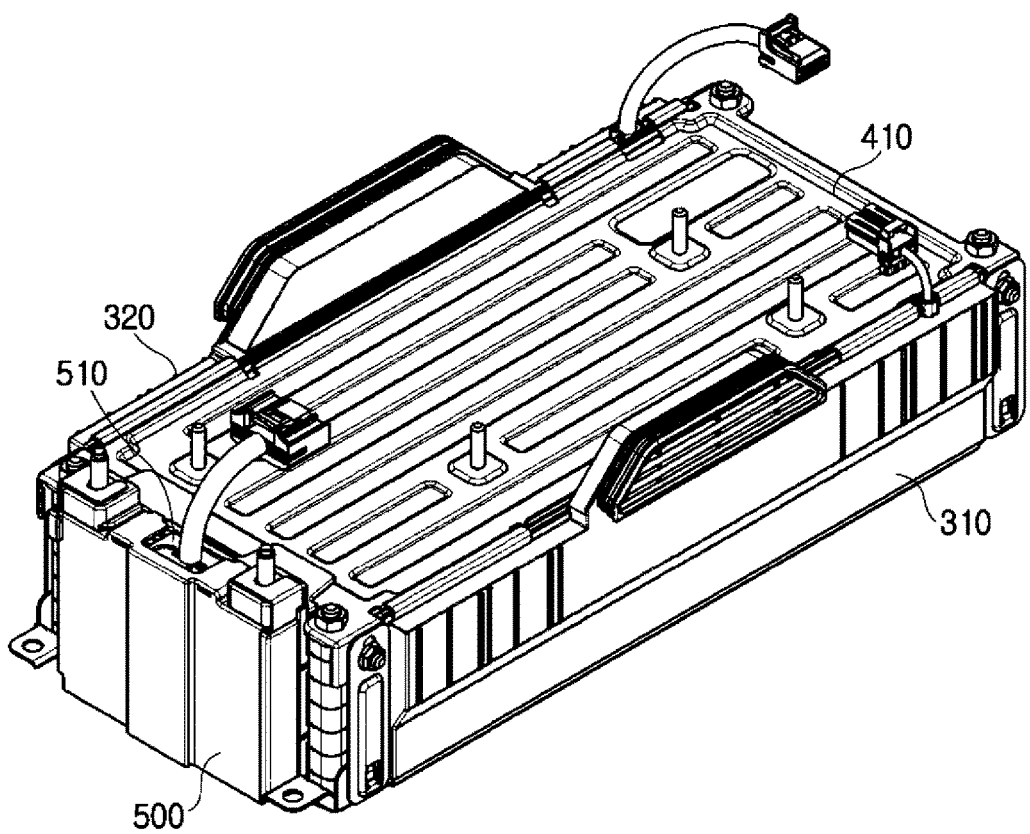
FIG. 7 is a perspective view schematically showing that a sensing assembly is added to the battery module of FIG. 2.

FIG. 7 is a perspective view schematically showing that a sensing assembly 500 is added to the battery module of FIG. 2.

Referring to FIG. 7, the sensing assembly 500 may be provided at a protruding portion of the electrode tab 110 of the secondary battery and measure characteristics such as a voltage of a secondary battery by coming into contact with the electrode tab 110.

At this time, since the opening of the venting flow path is formed at a portion where the electrode tab 110 is located, when a gas is generated from the secondary battery, the gas, namely a venting gas to be vent, may be oriented toward the sensing assembly 500 located at the opening of the venting flow path. Therefore, in the battery module according to the present disclosure, the sensing assembly 500 may have a discharge hole 510 for discharging the venting gas flowing out through the opening of the venting flow path. In particular, the discharge hole 510 may be formed at an upper portion of the sensing assembly 500 according to the present disclosure.

Therefore, in this configuration of the present disclosure, a venting gas flowing from a rear side of the battery module to a front side thereof flows toward the sensing assembly 500 through the opening of the venting flow path and discharges upwards through the discharge hole 510 of the sensing assembly 500.

Meanwhile, preferably, the battery module according to the present disclosure may have an uneven portion formed at an upper portion and/or a lower portion of the frame.

For example, if a second frame is stacked on a first frame as in the embodiment of FIG. 6, uneven portions may be formed respectively at an upper portion of the first frame and a lower portion of the second frame to correspond to each other. Here, the uneven portions may be composed of a convex portion which protrudes vertically and a concave portion 232 which is depressed vertically. Therefore, each frame may have a convex portion formed at an upper portion thereof and a concave portion 232 formed at a lower portion thereof with a shape corresponding to the convex portion, or may have a convex portion formed at the lower portion thereof and a concave portion 232 formed at the upper portion thereof.

If uneven portions are formed at the upper and lower portions of the first frame and the second frame as described above, when the first frame and the second frame are stacked, the uneven portions of the frames are coupled to each other, which may prevent a venting gas located inside the frames from flowing out of the frames.

For example, if the convex portion 231 is formed at the upper portion of the first frame and the concave portion 232 is formed at the lower portion of the second frame and has a shape corresponding to the convex portion 231 as in the embodiment of FIG. 6, the convex portion 231 of the first frame and the concave portion 232 of the second frame may be coupled to each other. In this case, since a path oriented from an inner side of the frames to an outer side thereof, namely oriented from a left side to a right side in FIG. 6, is formed complicatedly at the coupled portion of the convex portion 231 and the concave portion 232, even though a gas is generated from the secondary battery located at the inner side of the frames, the gas does not easily leak through the coupled portion of the convex portion 231 and the concave portion 232. Therefore, in this configuration of the present disclosure, due to the coupling of the convex portion 231 and the concave portion 232, it is possible to prevent a venting gas from flowing through a gap between the first frame and the second frame stacked to each other, but just allows the venting gas to flow mainly through the venting flow path.

Moreover, in this configuration of the present disclosure, if a gas is generated in the secondary battery to increase an inner pressure of the frames accommodating the secondary battery, for example to increase a pressure of a portion V in FIG. 6, this pressure applies a force to the frames from an inner side to an outer side, and thus the uneven portions of the frames may be deformed to some extent. In addition, this deformation forces the convex portion 231 and the concave portion 232 to be more closely adhered, thereby preventing the venting gas from flowing out through the gap between the stacked frames more effectively.

In particular, in the present disclosure, the uneven portions may be formed at each frame, for example a left unit frame (a left edge) and a right unit frame (a right edge) of the first frame and the second frame. Here, the opening of the cooling flow path may be formed at the left unit frame and the right unit frame of each frame. Therefore, in this configuration of the present disclosure, the uneven portion of each frame may be regarded as being formed at a unit frame where the opening of the cooling flow path is formed.

For example, in the embodiment of FIGS. 5 and 6, the opening O of the cooling flow path may be formed at the left unit frame and the right unit frame of each frame, and in this case, the uneven portions may be provided at upper and lower portions of the left unit frame and the right unit frame of each frame. In this embodiment of the present disclosure, due to the coupling configuration of the uneven portions formed at the left and right portions of the frames, it is possible to more securely prevent the venting gas inside the frames from flowing into the cooling flow path or the duct.

Also preferably, at least two uneven portions may be formed respectively at the upper and lower portions of each frame. This will be described below in more detail with reference to FIG. 8.

Figure 8:
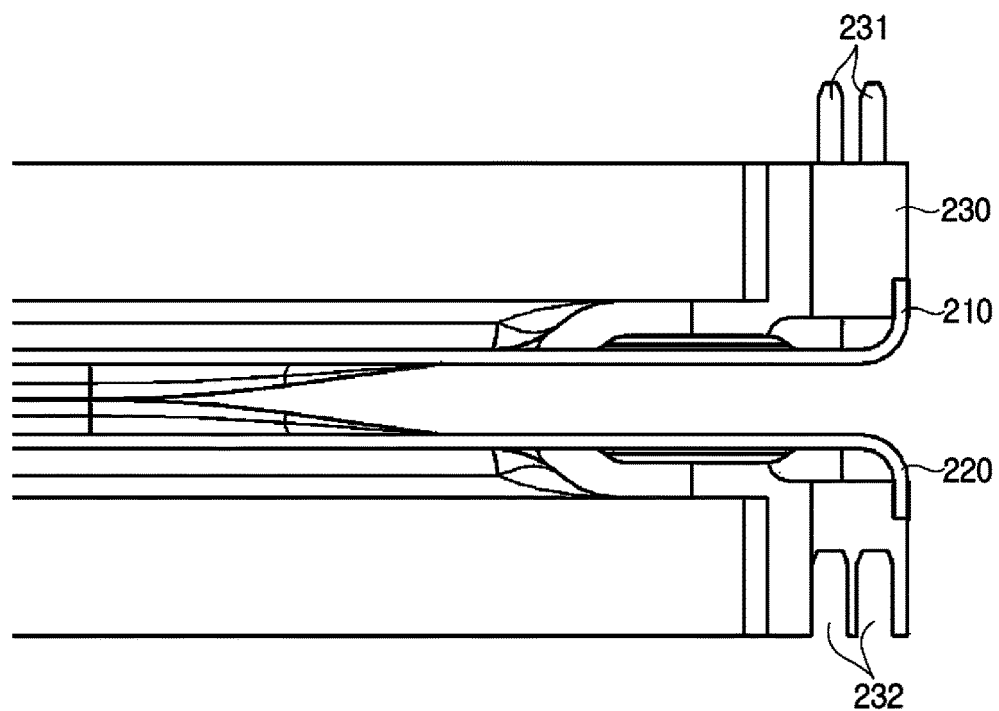
FIG. 8 is a cross-sectioned view showing a part of a frame according to another embodiment of the present disclosure.

FIG. 8 is a cross-sectioned view showing a part of a frame according to another embodiment of the present disclosure. For example, FIG. 8 may also be regarded as a modification of the cross section of the portion C of FIG. 3.

As shown in FIG. 8, two convex portions may be formed at an upper portion of a right edge of a frame, and two concave portions 232 may be formed at a lower portion of the right edge of the frame. In addition, the convex portions and the concave portions 232 may be located and shaped to correspond to each other in a vertical direction. In this case, if two or more frames are stacked vertically, two convex portions located at an upper portion of each frame may be inserted into and coupled to two concave portions 232 located at a lower portion of another frame stacked thereon. In addition, in two concave portions 232 located at a lower portion of each frame, two convex portions located at an upper portion of another frame stacked therebelow may be inserted and coupled.

Meanwhile, though not shown in the figures, two or more convex portions and two or more concave portions 232 may also be formed respectively at upper and lower portions of a left edge of each frame, so that convex portions and concave portions of frames stacked to each other may be coupled to each other.

In the embodiment where two or more uneven portions are formed respectively at the upper and lower portions of each frame as described above, it is possible to more securely prevent a venting gas inside the frames from flowing outwards through a gap between the frames. In other words, if two or more uneven portions are formed respectively at the upper and lower portions of each frame, a flowing path for the venting gas to flow outwards may be formed more complicatedly, which may further enhance the gas leakage prevention effect.

More preferably, if two or more uneven portions are formed respectively at the upper and lower portions of each frame, two or more uneven portions may be arranged in a lateral direction with respect to each of the first frame and the second frame.

For example, based on the configuration of FIG. 8, if two convex portions are formed at an upper portion of the right edge of each frame, two convex portions may be arranged in a lateral direction. In addition, two convex portions may be spaced apart from each other in a lateral direction. Moreover, two concave portions 232 formed at a lower portion of the right edge of the frame may be spaced apart from each other in a lateral direction. In this case, the plurality of uneven portions may be arranged from the inside of the frame toward an outer side, which prevents the venting gas from flowing out from the inside of the frame, thereby ensuring gas blocking ability.

Also preferably, the uneven portion may be configured so that convex portions 231 and concave portions 232 are formed at both upper and lower portions of each frame. This will be described later in more detail with reference to FIG. 9.

Figure 9:
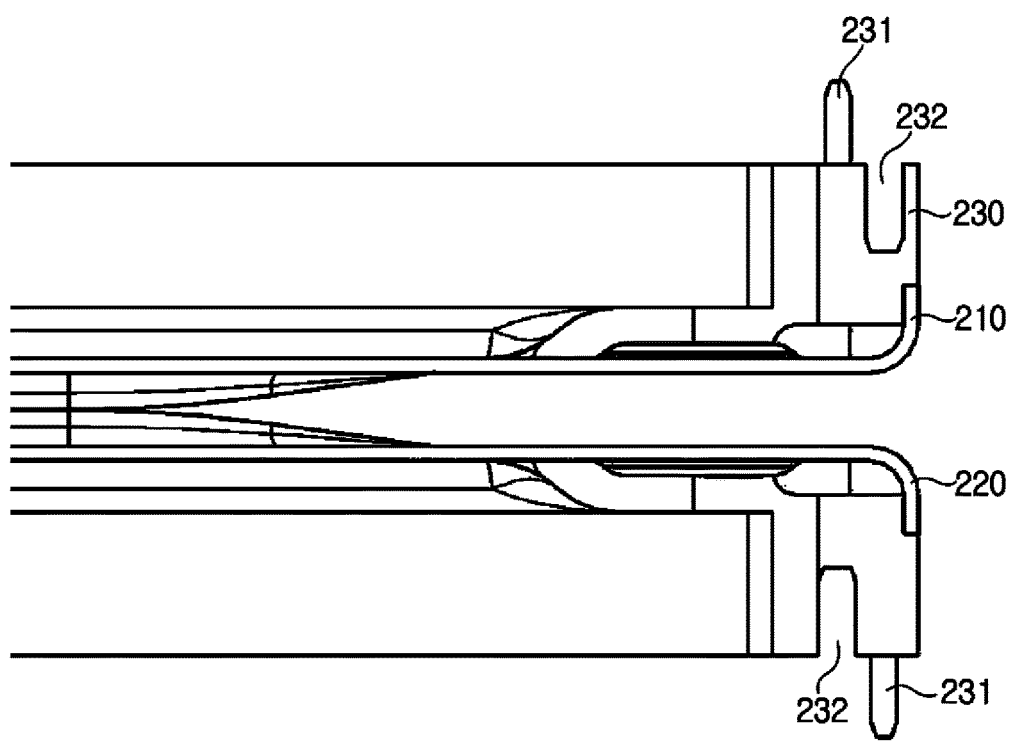
FIG. 9 is a cross-sectioned view showing a part of a frame according to further another embodiment of the present disclosure.

FIG. 9 is a cross-sectioned view showing a part of a frame according to further another embodiment of the present disclosure. For example, FIG. 9 may also be regarded as a modification of the cross section of the portion C of FIG. 3.

As shown in FIG. 9, a single convex portion and a single concave portion 232 may be formed at an upper portion of a right edge (a unit frame) of each frame. In addition, a single concave portion 232 and a single convex portion may be formed at a lower portion of the right edge of the frame to be located and shaped corresponding to the convex portion and the concave portion 232 formed at the upper portion. In this case, if two frames are stacked vertically, a convex portion and a concave portion 232 located at the upper portion of each frame may be coupled to a concave portion 232 and a convex portion located at a lower portion of another frame stacked thereon. In addition, a concave portion 232 and a convex portion formed at the lower portion of each frame may be coupled to a convex portion and a concave portion 232 located at the upper portion of another frame stacked therebelow.

In addition, though not shown in the figures, convex portions and concave portions 232 may also be formed at upper and lower portions of a left edge of each frame.

In this configuration of the present disclosure, due to various uneven portions formed at upper and lower portions of each frame, a gas discharging path from a left side of the frame to a right side thereof may be formed more complicatedly. Therefore, in this configuration of the present disclosure, even though a venting gas is generated from the secondary battery, it is possible to more effectively prevent the venting gas from flowing out from the inside of the frame to an outer side, thereby securely preventing the venting gas from flowing into the cooling flow path.

Figure 10:
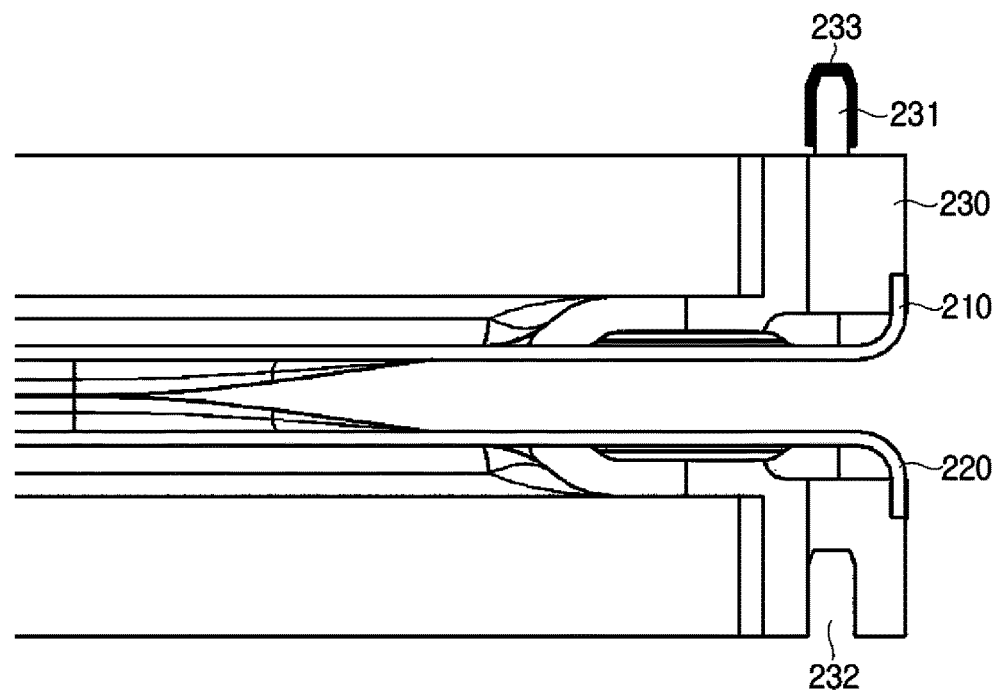
FIG. 10 is a cross-sectioned view showing a part of a frame according to further another embodiment of the present disclosure.

FIG. 10 is a cross-sectioned view showing a part of a frame according to further another embodiment of the present disclosure. For example, FIG. 10 may also be regarded as a modification of the cross section of the portion C of FIG. 3.

Referring to FIG. 10, the frame may have a frame sealing member 233 at the uneven portion. Here, the frame sealing member 233 may be regarded as a component provided at the uneven portion to enhance sealing when the uneven portion is coupled with another uneven portion. The frame sealing member 233 may be provided at a surface of the convex portion 231 as shown in FIG. 10, so that the frame sealing member 233 is located at a coupled portion when uneven portions are coupled. In other case, the frame sealing member 233 may be provided at a surface of the concave portion 232, or at surfaces of both the convex portion 231 and the concave portion 232.

The frame sealing member 233 may be made of various materials such as rubber, silicon or the like. Such materials may more easily ensure the sealing so that fluid is not able to move through a gap between frames, due to their properties such as elasticity. However, the present disclosure is not limited to such specific materials of the frame sealing member 233, and the frame sealing member 233 may be made of any other materials capable of ensuring the sealing force.

Also preferably, in the battery module according to the present disclosure, the pouch-type secondary battery accommodated in the inner space of the frames may be configured so that a left sealing portion and a right sealing portion thereof may be folded inwards.

For example, as indicated by a portion E in FIG. 6, the pouch-type secondary battery may be accommodated in the inner space of the frames so that its right sealing portion is bent inwards. At this time, the right side may be a side where the uneven portion of the frame is formed, or a side where the opening of the cooling flow path is formed. In addition, though not shown in the figures, the pouch-type secondary battery may be shaped so that its left sealing portion is bent inwards, symmetrically to the right sealing portion in a lateral direction.

In this configuration of the present disclosure, since the sealing portion is bent into the frame toward the secondary battery, then end of the sealing portion may be oriented toward an inner side of the secondary battery, rather than an outer side of the secondary battery. Therefore, even though a gas is generated in the secondary battery and flows toward an end of the sealing portion, the venting gas is not ejected directly toward the frame, and thus it is possible to more effectively prevent the venting gas from flowing out through a gap of the stacked frames.

In particular, in the battery module according to the present disclosure, in a space between a lower cooling plate 220 of a frame (a second frame) located at an upper portion and an upper cooling plate 210 of a frame (a first frame) located at a lower portion, two secondary batteries may be accommodated. At this time, on the basis of such two secondary batteries, a sealing portion of the secondary battery located at the lower portion may be bent upwards, and a sealing portion of the secondary battery located at the upper portion may be bent downwards. Further, as shown in FIG. 6, the bent portions of the sealing portions of each secondary battery may at least partially come into contact with each other.

In this configuration of the present disclosure, the venting gas leaking out through the sealing portion of the secondary battery and flowing outwards may be primarily blocked by the contact portion of the sealing portions. Therefore, in this configuration of the present disclosure, it is possible to more effectively prevent the venting gas from flowing out through the space between the stacked frames.

Meanwhile, the battery module according to the present disclosure may further include an upper end plate 410 and a lower end plate 420, as shown in FIG. 1.

The upper end plate 410 and the lower end plate 420 may be configured to have a plate shape with a large area, and the upper end plate 410 and the lower end plate 420 may be respectively located at upper and lower portions of the battery module to cover upper and lower portions of each frame and each secondary battery. The upper end plate 410 and the lower end plate 420 may give a mechanical supporting force to the battery module and play a role of protecting the secondary battery against external impacts at the upper and lower portions of the secondary battery. For this, the upper end plate 410 and the lower end plate 420 may be made of metallic material such as steel to ensure rigidity.

The plurality of frames and the plurality of pouch-type secondary batteries may be interposed between the upper end plate 410 and the lower end plate 420 and be fixed between the upper end plate 410 and the lower end plate 420. For this, the upper end plate 410, the lower end plate 420 and the frame may have components for coupling them to each other. For example, as shown in FIGS. 1 and 2, the frame may have vertical insert holes formed at four corners thereof, and in this case, insert rods are provided to the lower end plate 420 at corresponding locations, so that each insert rod of the lower end plate 420 is inserted into each insert hole of the frame to fix the frame to the lower end plate 420. In addition, a hole may be formed in the upper end plate 410 so that the insert rod of the lower end plate 420 may be inserted therein, and the insert rod inserted into the hole may be fixed by means of a nut or the like.

A battery pack according to the present disclosure may include one or more battery modules as described above. At this time, the battery pack may include a pack case for accommodating the battery module, in addition to the battery module.

Figure 11:
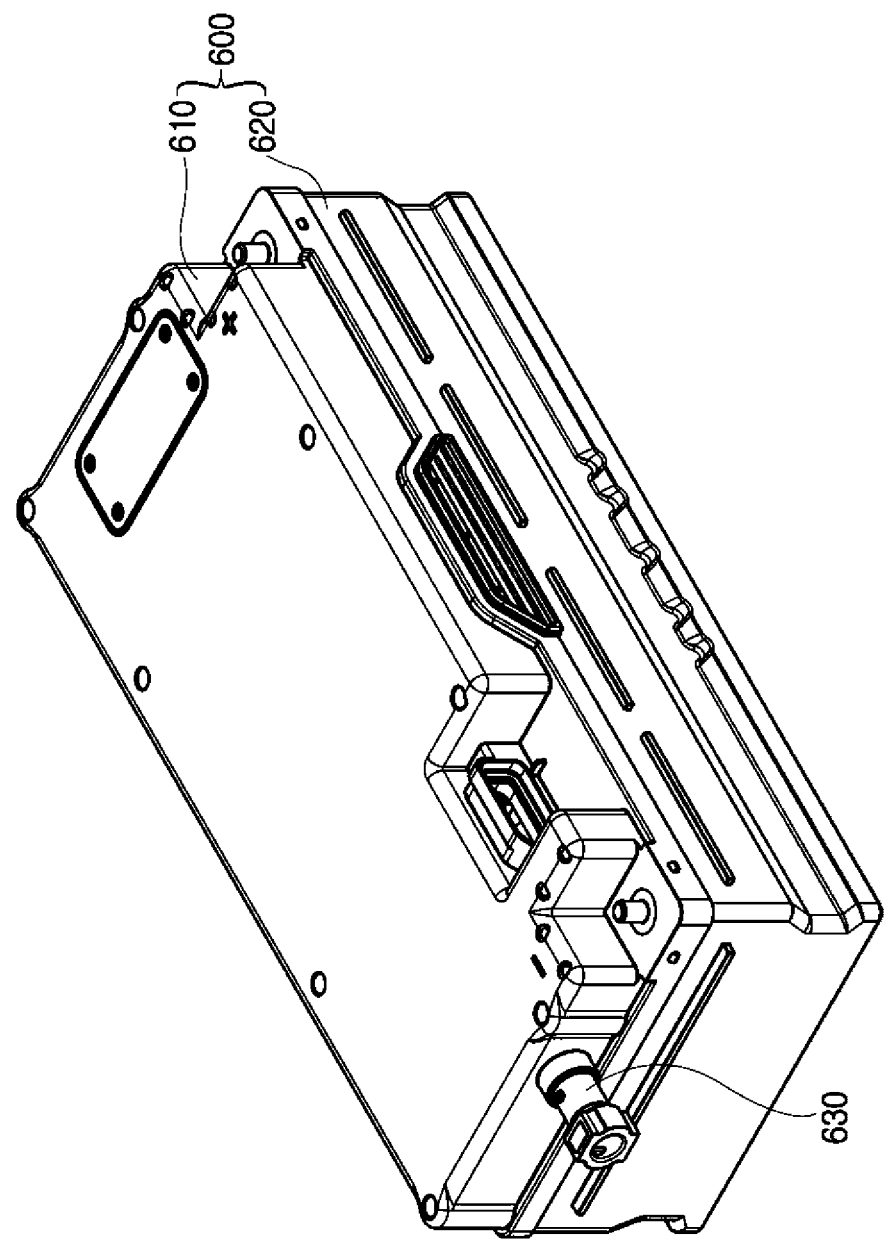
FIG. 11 is a perspective view schematically showing a pack case according to an embodiment of the present disclosure.

FIG. 11 is a perspective view schematically showing a pack case according to an embodiment of the present disclosure.

Referring to FIG. 11, the battery pack according to the present disclosure may include a pack case 600, and the pack case 600 may be configured to include an upper case 610 and a lower case 620, so that a battery module is accommodated in an inner space of the lower case 620. In particular, the pack case 600 according to the present disclosure may include a venting portion 630 for allowing a gas generated at the secondary battery, namely a venting gas, to flow out of the battery pack. At this time, the venting portion 630 may have a venting valve for regulating an amount of venting gas or the like.

As shown in FIG. 11, the venting portion 630 may be formed at an upper portion of the pack case 600, for example at the upper case 610. In this case, in the battery module according to an embodiment of the present disclosure, as shown in FIG. 7, the opening of the venting flow path may be formed at a side where the electrode tab 110 is provided, and the sensing assembly 500 may be provided at the opening of the venting flow path. At this time, the discharge hole 510 may be formed at an upper portion of the sensing assembly 500 so that the gas flowing out of the opening of the venting flow path is discharged upwards, thereby guiding the venting gas to flow toward the venting portion 630 of the pack case 600.

Meanwhile, even though FIG. 11 illustrates that the venting portion 630 is formed only at the front surface of the pack case 600, two or more venting portions 630 may be formed at the pack case 600. For example, the venting portion 630 of the pack case may be formed at the rear surface of the pack case 600, in addition to the front surface thereof. In this case, in the battery module, an opening of the venting flow path may also be formed at a side opposite to the electrode tab 110.

In addition, the battery pack according to the present disclosure may further include various devices for controlling the battery module, for example a battery management system (BMS), a current sensor, a fuse and so on, in addition to the pack case 600.

The battery module according to the present disclosure may be applied to a vehicle such as an electric vehicle and a hybrid vehicle. In other words, the vehicle according to the present disclosure may include the battery module according to the present disclosure.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

Meanwhile, when the terms indicating up, down, left, right, front and rear directions are used in the specification, it is obvious to those skilled in the art that these merely represent relative locations for convenience in explanation and may vary based on a location of an observer or a shape in which an object is placed.

What is claimed is:

1. A battery module, comprising:
a plurality of pouch-type secondary batteries;
a first frame having an upper cooling plate and a lower cooling plate disposed to be spaced apart from each other by a predetermined distance in a vertical direction to form a cooling flow path in a space therebetween and configured to accommodate a first pouch-type secondary battery of the plurality of pouch-type secondary batteries in at least one of an upper portion of the upper cooling plate and a lower portion of the lower cooling plate, the cooling flow path having openings at right and left sides thereof to allow a cooling gas to flow in a right and left direction;
a second frame having an upper cooling plate and a lower cooling plate to accommodate a second pouch-type secondary battery of the plurality of pouch-type secondary batteries in a way identical to the first frame, the second frame being stacked on the first frame to form a venting flow path in a space between the first frame and the second frame, the venting flow path having an opening in at least one of a front side and a rear side to allow a venting gas to flow in a front and rear direction;
an inflow duct located at a first side of the battery module and covering a first opening of the cooling flow path and being configured to introduce the cooling gas into the cooling flow path; and
an outflow duct located at a second side of the battery module, opposite to the first side, and covering a second opening of the cooling flow path, opposite to the first opening of the cooling flow path, and being configured to discharge the cooling gas.

2. The battery module according to claim 1,
wherein the venting flow path is physically separated from the cooling flow path.

3. The battery module according to claim 1,
wherein the venting flow path is formed at a location where a sealing portion of the pouch-type secondary battery is located, in a space between the upper cooling plate of the first frame and the lower cooling plate of the second frame.

4. The battery module according to claim 1,
wherein the inflow duct is configured to cover the right opening of the cooling flow path and has an inlet formed at an outer side thereof and an open portion formed at an inner side thereof so that the cooling gas is introduced through the inlet and flows into the cooling flow path through the open portion, and
wherein the outflow duct is configured to cover the left opening of the cooling flow path and has an outlet formed at an outer side thereof and an open portion formed at an inner side thereof so that the cooling gas is discharged from the cooling flow path flows into the open portion and flows out through the outlet.

5. The battery module according to claim 4, wherein at least one of the inflow duct and the outflow duct has a duct sealing member at a portion in contact with the first frame and the second frame to prevent a gas leakage.

6. The battery module according to claim 1,
wherein an electrode tab of the secondary battery is located at the opening of the venting flow path,
wherein the battery module further comprises a sensing assembly coming into contact with the electrode tab of the secondary battery to measure a voltage of the secondary battery, and
wherein the sensing assembly has a discharge hole formed at an upper portion thereof to discharge a venting gas introduced at the opening of the venting flow path.

7. The battery module according to claim 1,
wherein uneven portions are formed at an upper portion of the first frame and a lower portion of the second frame to have shapes corresponding to each other, and when the first frame and the second frame are stacked, the uneven portions are coupled to each other to prevent an interior venting gas from flowing outwards.

8. The battery module according to claim 7,
wherein the uneven portions are formed at a left unit frame and a right unit frame of the first frame and the second frame.

9. The battery module according to claim 7,
wherein the uneven portions include at least two uneven portions formed at an upper portion of the left unit frame of the first frame and an upper portion of the right unit frame of the first frame, respectively, and at least two uneven portions formed at an upper portion of the left unit frame of the second frame and an upper portion of the right unit frame of the second frame, respectively.

10. The battery module according to claim 9,
wherein the two or more uneven portions are arranged in a right and left direction with respect to the first frame and the second frame, respectively.

11. The battery module according to claim 10,
wherein the uneven portions are configured to have a convex portion and a concave portion at all of the upper portions and the lower portions of the first frame and the second frame, respectively.

12. The battery module according to claim 1,
wherein the first frame has a frame sealing member provided at an upper portion thereof to prevent a gas from leaking between the first frame and the second frame.

13. The battery module according to claim 1,
wherein the pouch-type secondary battery has a left sealing portion and a right sealing portion which are folded inwards.

14. A battery pack, comprising the battery module defined in claim 1.

15. A vehicle, comprising the battery module defined in claim 1.

* * * * *